US010198150B2

(12) United States Patent
Dimitropoulos et al.

(10) Patent No.: US 10,198,150 B2
(45) Date of Patent: Feb. 5, 2019

(54) CROSS DATABASE DATA SELECTION AND CORRELATION INTERFACE

(71) Applicant: Electronic Arts Inc., Redwood City, CA (US)

(72) Inventors: Panagiotis Peter Dimitropoulos, Vancouver (CA); Stefan Carscallen Lorimer, Vancouver (CA)

(73) Assignee: Electronics Arts Inc., Redwood City, CA (US)

( * ) Notice: Subject to any disclaimer, the term of this patent is extended or adjusted under 35 U.S.C. 154(b) by 371 days.

(21) Appl. No.: 15/064,159

(22) Filed: Mar. 8, 2016

(65) Prior Publication Data

US 2017/0262140 A1 Sep. 14, 2017

(51) Int. Cl.
G06F 3/0482 (2013.01)
G06F 3/0486 (2013.01)
G06N 99/00 (2010.01)
G06F 17/30 (2006.01)
G06F 3/0481 (2013.01)

(52) U.S. Cl.
CPC .......... G06F 3/0482 (2013.01); G06F 3/0486 (2013.01); G06F 3/04817 (2013.01); G06F 17/30389 (2013.01); G06N 99/005 (2013.01)

(58) Field of Classification Search
CPC ................................................... G06F 3/0482
USPC ........................................................ 715/744
See application file for complete search history.

(56) References Cited

U.S. PATENT DOCUMENTS

| 9,424,333 | B1* | 8/2016 | Bisignani | G06F 17/30592 |
|---|---|---|---|---|
| 9,766,779 | B2* | 9/2017 | Colle | G06F 3/0482 |
| 2009/0106238 | A1* | 4/2009 | Lita | G06F 17/30616 |
| 2009/0300544 | A1* | 12/2009 | Psenka | G06F 17/30554 |
| | | | | 715/810 |
| 2010/0318929 | A1* | 12/2010 | Hilton | G06F 3/0486 |
| | | | | 715/769 |
| 2012/0131484 | A1* | 5/2012 | Neumann | G06F 17/30696 |
| | | | | 715/769 |
| 2012/0166470 | A1* | 6/2012 | Baumgaertel | G06F 17/30554 |
| | | | | 707/769 |
| 2013/0069951 | A1* | 3/2013 | Dembo | G06T 11/206 |
| | | | | 345/440.2 |
| 2014/0180711 | A1* | 6/2014 | Kamen | G06Q 10/06 |
| | | | | 705/2 |
| 2014/0258930 | A1* | 9/2014 | Colle | G06F 3/0482 |
| | | | | 715/810 |

(Continued)

Primary Examiner — William D Titcomb
(74) Attorney, Agent, or Firm — Lowenstein Sandler LLP

(57) ABSTRACT

A method of cross database selection and correlation may include receiving an indication that a first graphical object representing a first dataset has been dragged onto a second graphical object representing a second dataset on a dashboard page of a graphical user interface (GUI). The method may further include sending the first and second dataset to a server and receiving a third dataset, based on a combination of the first and second datasets, and one or more options to define the third dataset.

The method may include providing, for display on a second page of the GUI, a third graphical object representing the third dataset and one or more graphical objects representing the options associated with the third dataset. The method may further include receiving an indication that the third graphical object should be finalized, and providing the third graphical object for display on the dashboard page of the GUI.

20 Claims, 9 Drawing Sheets

(56) References Cited

U.S. PATENT DOCUMENTS

| | | | | |
|---|---|---|---|---|
| 2015/0220539 A1* | 8/2015 | Lambert | ........... | G06F 17/30696 |
| | | | | 707/723 |
| 2015/0310343 A1* | 10/2015 | Netz | ...................... | G06N 5/048 |
| | | | | 706/11 |
| 2016/0125515 A1* | 5/2016 | Josefiak | ............. | G06Q 30/0641 |
| | | | | 705/27.1 |
| 2016/0210646 A1* | 7/2016 | Edmonds | ........... | G06Q 30/0201 |

\* cited by examiner

CROSS DATABASE DATA SELECTION AND CORRELATION INTERFACE

TECHNICAL FIELD

The present disclosure is generally related to cross database data selection and correlation, and is more specifically related to displaying and maintaining an interface for cross database data selection and correlation.

BACKGROUND

As video and computer games become more popular, collecting and organizing customer feedback in a useful manner are becoming increasingly difficult. Bug reporting is one method by which customers of video games relay their satisfaction and desired improvements to game developers. As more games are created and released, the harder it becomes for video game developers to search through and make sense of user submitted comments and bug reports to identify the areas in which the most efficient game improvements may be made. Traditionally, game developers (or others tasked with identifying specific game improvements) have needed to reference numerous databases where user comments and reports reside to get a complete picture of the issues that arise in a particular game. Searching through numerous databases and compiling reports based on trends across all databases is a tedious and time-consuming job, often requiring technical knowledge of the underlying database technology.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
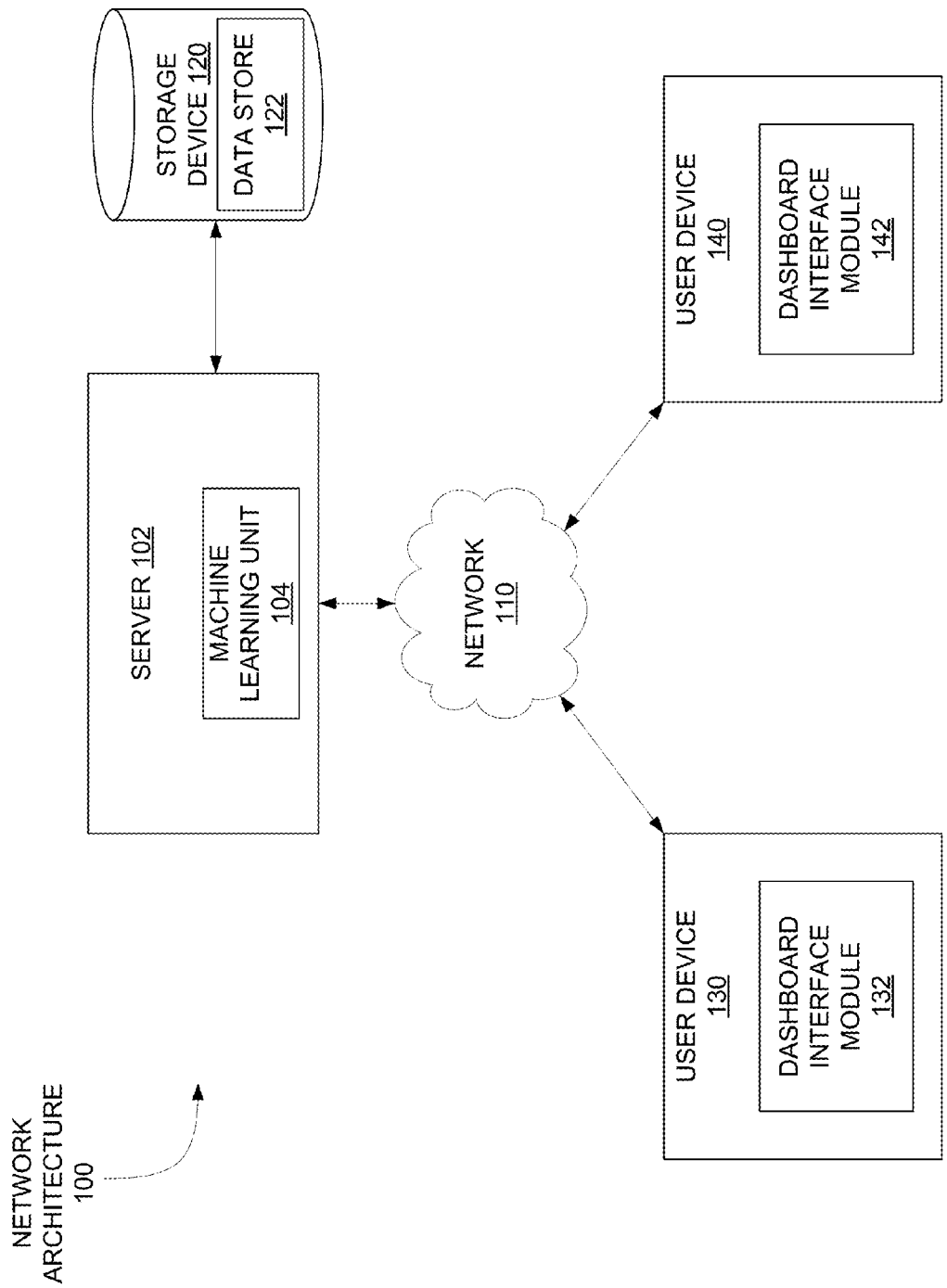
FIG. 1 is a block diagram illustrating an exemplary network architecture in which embodiments of the present disclosure may be implemented.

Described herein are methods and systems for a cross database data selection and correlation interface. Such methods and systems may be employed, for example, in various database and certification applications for cross referencing databases to get an accurate picture of issues related to new video games or video game updates.

In an illustrative embodiment, a game developer wants to create a report assessing player sentiment associated with new issues arising in the last week from ten popular games. The developer may have access to a cross database data selection and correlation interface (e.g., a dashboard of a graphical user interface (GUI)), and the interface may provide the developer with components related to popular actions and reports desired by the developer. For example, a first page of the dashboard of the interface may include a component to display the number of new issues reported related to particular games in the last week. A second component may display the number of new issues reported for a particular game.

Further components may include information such as the number of issues by platform, top issues today, and top issues being reported. Clicking on a component may provide the developer with a more detailed look at the data reported by the component. For example, clicking on the "number of new issues reported" component may cause the GUI to display more information about the type of new issues reported, the timing of their report, and the databases in which the issues were first reported by users of a game.

In one embodiment, a developer may associate two or more components of the interface together to create a new component. To cause the association, the developer may drag one component onto another component in the GUI. When one component is dragged onto another component, the GUI may display a second page to the developer that allows for further modification of the new component created. In one embodiment, when the first and second components are associated with each other, machine learning algorithms identify patterns in the data associated with the components to create a new learned dataset based on the first and second components.

This new learned dataset may be a third component, which provides a developer with new information. For example, if a "new issues reported" component is dragged onto an "issues in this week" component, a third component may be created based on the now associated components. Machine learning algorithms may determine that a developer desires a third component that displays new issues reported within the last week and create the component to display the corresponding information on the dashboard. Newly created components may be further refined. In one embodiment, when a developer drags one component onto another, various options based on a machine learning analysis of the combination are displayed to the developer on a second page of the GUI.

In the above example, the newly created "new issues reported this week" may cause options related to game platform to be displayed to the developer. A developer may choose, by dragging an option onto the newly created component (or the component onto the option), to associate the option with only games on the iOS® platform, for example. A new component may be created based on the combination with the platform option, the new component also undergoing machine learning analysis to determine additional options associated with the new component. The process may continue as long as machine learning analysis determines additional options based on newly created components. Once a developer is satisfied with a new component, he may activate a button on the GUI to indicate that the new component is complete. Performing such action may cause the new component to be displayed on the first page of the GUI, with the rest of the existing components.

FIG. 1 is a block diagram illustrating an exemplary network architecture in which embodiments of the present disclosure may be implemented. The network architecture 100 may include one or more servers 102 communicating with one or more storage devices 120 and one or more user devices 130, 140 over one or more networks 110, according to one embodiment. Network 110 can be a local area network (LAN), a wireless network, a telephone network, a mobile communications network, a wide area network (WAN), such as the Internet, or similar communication system.

Server 102 may include a network-accessible server-based functionality, various data stores, and/or other data processing equipment. The server 102 may be implemented by a single machine or a cluster of machines. Server 102 may include, for example, computer system 900 of FIG. 9. In one embodiment, server 102 includes machine learning unit 104. Machine learning unit may perform machine learning analysis on data provided by storage device 120 and/or user devices 130, 140.

Server 102 may be one server or it may represent multiple servers. In one embodiment, when a first user device 130 connects to server 102 and a second user device 140 connects to server 102, server 102 may be the same server that handles both devices' connections. In another embodiment, when a first user device 130 connects to server 102 and a second user device 140 connects to server 102, server 102 may represent different servers, so that each device connects to a different server.

In one embodiment, storage device 120 includes data store 122, which may include data provided by server 102 and/or user devices 130, 140. In another embodiment, data provided by server 102 and/or user devices 130, 140 are stored elsewhere, outside of data store 122 or storage device 120.

In one embodiment, server 102 may include machine learning unit 104 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, user devices 130, 140 may be any computing device (e.g., personal computer, server, mobile device, tablet, etc.). User devices 130, 140 may include dashboard interface modules 132, 142. In one embodiment, dashboard interface modules 132, 142 provide cross database data selection and correlation functionality, as described herein.

Figure 2:
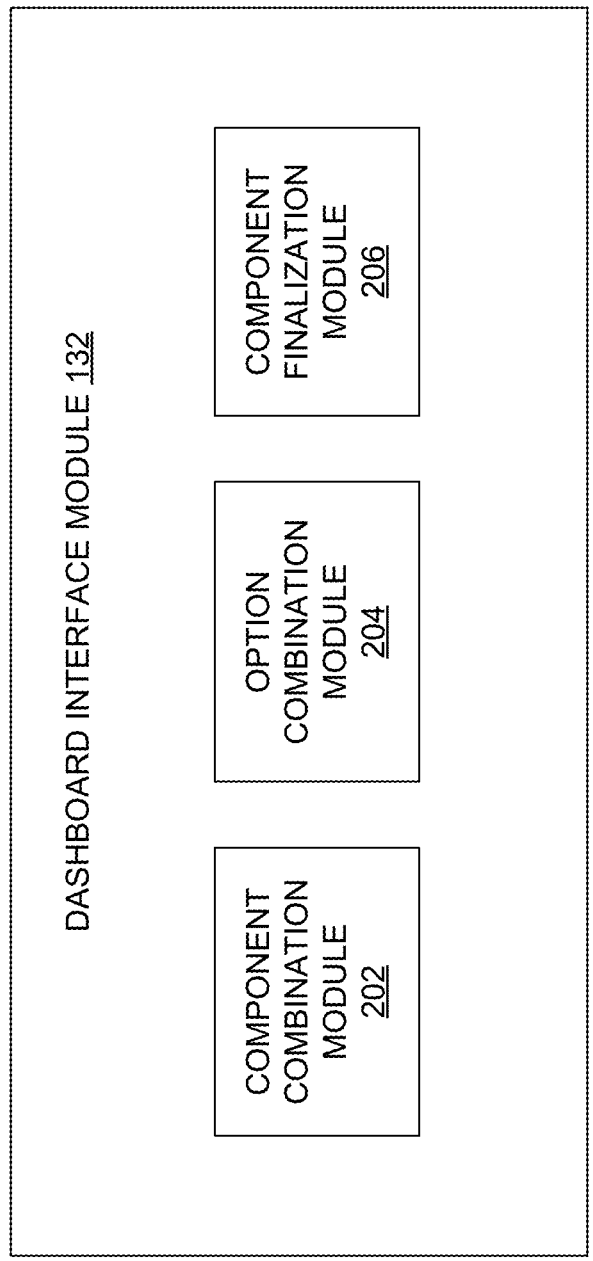
FIG. 2 is a block diagram illustrating a dashboard interface module, according to an implementation.

FIG. 2 is a block diagram illustrating a dashboard interface module, according to an implementation. In one embodiment, dashboard interface module 132 is included in user device 130 of FIG. 1. Dashboard interface module may include a component combination module 202, option combination module 204, and component finalization module 206. This arrangement of modules may be a logical separation, and in other embodiments, these modules or other components can be combined together or separated in further components, according to a particular embodiment.

Component combination module 202 may be responsible for creating new components based on two or more combined components. In one embodiment, when a user of a user device drags one component of a dashboard onto another component of a dashboard, component combination module 202 may send the learned datasets associated with the two components to a server to undergo machine learning analysis. The server may create, based on machine learning algorithms, a third learned dataset.

In one embodiment, a machine learning algorithm represented by the following pseudo code may be used to create the third learned dataset:
- Extract RelevantData from X Source Object to build data warehouse
- Where RelevantData=selected tables and columns from Source Objects,
  X=Number of Source Objects,
  SourceObjects=data sources including different types of databases.
- Build Reference Tables for PlayerIssueConfigs
- Where Reference Tables=static entity data tables for the use case,
  PlayerIssueConfigs=entity reference data across sources
- Implement StoredProcedures to get unified PlayerIssueData from all the sources
- Where StoredProcedures=tabular queries with user query input parameters,
  PlayerIssueData=data for the particular use case, e.g. issue number and details with respect to query parameters of platform, title, source provider etc.
- Create APIs to display the Results
- Where APIs=function calls to return query Results based on StoredProcedures,
  Results=player issue data for the use case.

In other embodiments, various other machine learning algorithms may be used to create the third dataset.

The server may send the new, third learned dataset back to the user device. In one embodiment, component combination module 202 receives the third learned dataset and displays it as a third component on a GUI associated with the third component. In one embodiment the third component and is displayed on a dashboard page of the GUI.

In one embodiment, the server may determine additional options based on the third learned dataset and send the determined options with the third learned dataset to the user device. In one embodiment, option combination module 204 receives the options associated with the third component and displays them on the GUI associated with the user device. A user may drag one of the options associated with the third component onto the third component, and the option combination module may send the learned dataset and selected option to a server to undergo further machine learning analysis. The server may create a fourth learned dataset based on the third component and selected option and send the fourth learned dataset back to the component combination module 202. Additionally, the server may determine based on machine learning algorithms, new options associated with the fourth component and send them to option combination module 204 to be received and displayed on the GUI. In one embodiment the fourth component and associated options are displayed on a dashboard page of the GUI. There is no limit to the number of components able to be created with associated options.

When a user is satisfied with a newly created component, he may activate a user interface element on the GUI to indicate that he would like to finalize the creation of the component. In one embodiment, the user interface element is a graphical element (e.g., a button). In one embodiment, component finalization module 206 receives the indication that a component should be finalized. Once indication has been received, component finalization module 206 may provide a graphical representation of the finalized component on a dashboard page of the GUI. In one embodiment, the page where the finalized component is to be displayed is different than the page where the component and associated options were displayed. In another embodiment, they are displayed on the same page of the GUI.

Figure 3:
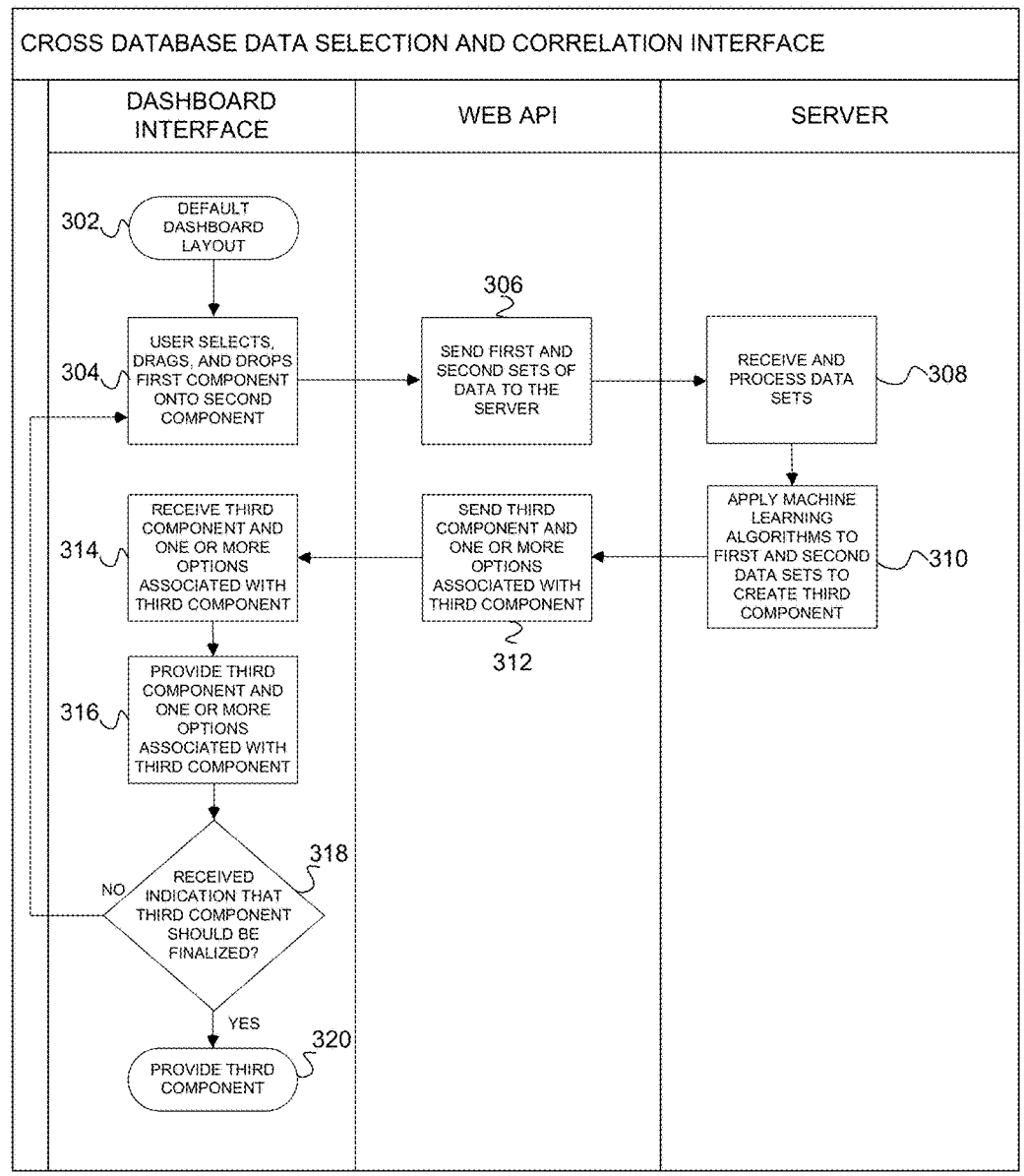
FIG. 3 is a flow diagram illustrating a cross database data selection and correlation interface processing flow, according to an implementation.

FIG. 3 is a flow diagram illustrating a cross database data selection and correlation interface processing flow, according to an implementation. The processing flow method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can provide a cross database data selection and correlation interface. In one embodiment, dashboard interface module 132 may perform method 300. Method 300 may be performed in any order so as to fit the needs of the interface and functionality to be provided.

Referring to FIG. 3, at block 302, processing logic provides a default dashboard view for display on a graphical user interface (GUI). The default dashboard view may include one or more components that have already been created. Processing logic may provide for interaction with elements (e.g., component elements, buttons, links, etc.) of the dashboard view with associated responses when different actions have been performed. For example, a user may drag one component onto another component by using a mouse or some other means of interacting with graphical elements of the dashboard. In one embodiment, a finger may be used to interact with elements of a touch screen display associated with the dashboard.

At block 304, a user selects and drags one interface element onto another. The interface elements may be graphical representations of components of the dashboard. Processing logic receives an indication that the one component was dragged onto the other component. In one embodiment, processing logic receives the indication when the user lets go of the dragged component (e.g., let's go of the mouse button while the second component is over the first). In one embodiment, both components are displayed on the default dashboard view page of the GUI.

At block 306, processing logic sends a first set of data associated with the first component and a second set of data associated with the second component to a server. The first and second sets of data may be unique learned datasets. A unique dataset may be derived when two or more sets of data components are merged and a new third dataset is derived from the two or more merged components. The third dataset may be considered unique since it does not represent the first or second component but is newly derived.

In one embodiment, the server receives the datasets (block 308) and applies machine learning algorithms to the associated first and second components (learned datasets) to determine a third component (learned dataset) and one or more options associated with the third component (block 310). When the server sends the newly created third dataset and associated options at block 312, processing logic receives the newly created third dataset and associated options at block 314.

In one embodiment, the server applies machine learning algorithms to the associated first and second learned datasets to identify patterns within the associated datasets. Using the determined patterns, machine learning algorithms create a third learned dataset associated with the first and second datasets. For example if a first dataset includes all new issues reported about a particular video game and a second dataset includes all issues reported about the video game in the last week, machine learning algorithms may provide all new issues reported about the video game in the last week. In another example, if a first dataset includes all issues associated with the most popular ten games, and a second dataset includes issues reported today, machine learning algorithms may provide a new dataset that includes all issues reported today that are associated with the most popular ten games.

Processing logic may display the new component and associated options on the GUI. In one embodiment, machine learning algorithms may identify one or more options associated with a newly determined component. Applying an option to a component may further define the scope of the component. For example, options may be associated with a particular platform on which games are played. Applying an iOS® "option" to a component further defines the scope of the component to apply to only reports received associated with the iOS® version of the game. Further defining a component through the use of associating options allows machine learning algorithms to better identify additional options to present to a user.

Processing logic at block 318 determines if an option has been dragged onto an associated component. If an option has been dragged onto an associated component, process flow continues to block 304 and 306 where the dataset associated with the component and the dataset associated with the option are sent to the server to undergo machine learning analysis. A fourth component with associated options may then be received at block 314. This process may continue for as long an option is selected to be associated with a component.

When an option is not selected to be associated with a component and an indication is received that the component should be finalized, processing flow continues to block 320 where the finalized component is displayed on the GUI. In one embodiment, the finalized component is displayed on a default dashboard page of the GUI. In one embodiment, the default dashboard page is a different page than the page of the GUI on which the non-finalized component and associated options are displayed.

Figure 4:
FIG. 4 is a block diagram illustrating a first page of a dashboard interface, according to an implementation.

FIG. 4 is a block diagram illustrating a first page of a dashboard interface, according to an implementation. In one embodiment, dashboard interface module 132 provides the dashboard interface and handles interaction with the dashboard interface (see method 300). In one embodiment, a first page of the dashboard interface is a "default dashboard page," where various components are displayed. For example, block 404 represents a single component displayed on the default dashboard page of a GUI. Component 404 represents an "issues in this week" component. Other various components are displayed. There is no limit to the number of components that may be displayed on a dashboard page. In one embodiment, components may be moved to different positions on a dashboard page by dragging them to a new position and dropping them.

In one embodiment, a component may be dragged on top of another component and dropped, for example as shown with respect to block 402. There, a "new issues" component is dragged and dropped on top of the "issues in this week" component. In one embodiment, dragging one component on top of another and dropping causes processing logic to perform method 300. By dragging one component onto another and dropping, a user of the dashboard interface may indicate his desire to combine the two components to create a new, related third component. In another embodiment, a user may indicate his desire to create a third, related component by some other means (e.g., right clicking on a component and activating a link, clicking on a dedicated component creation button, etc.). As shown other graphical elements may be displayed on the default dashboard page of the GUI. Graphical elements may include, for example, a new widget creation button (also reference to as a new component creation button), a search field, dashboard view button, and a settings button. In one embodiment, clicking on a component while on the default dashboard view causes the view to change to a detailed view of the component. The detailed view may provide to the user a detailed look at the data and databases included in the component.

Figure 5:
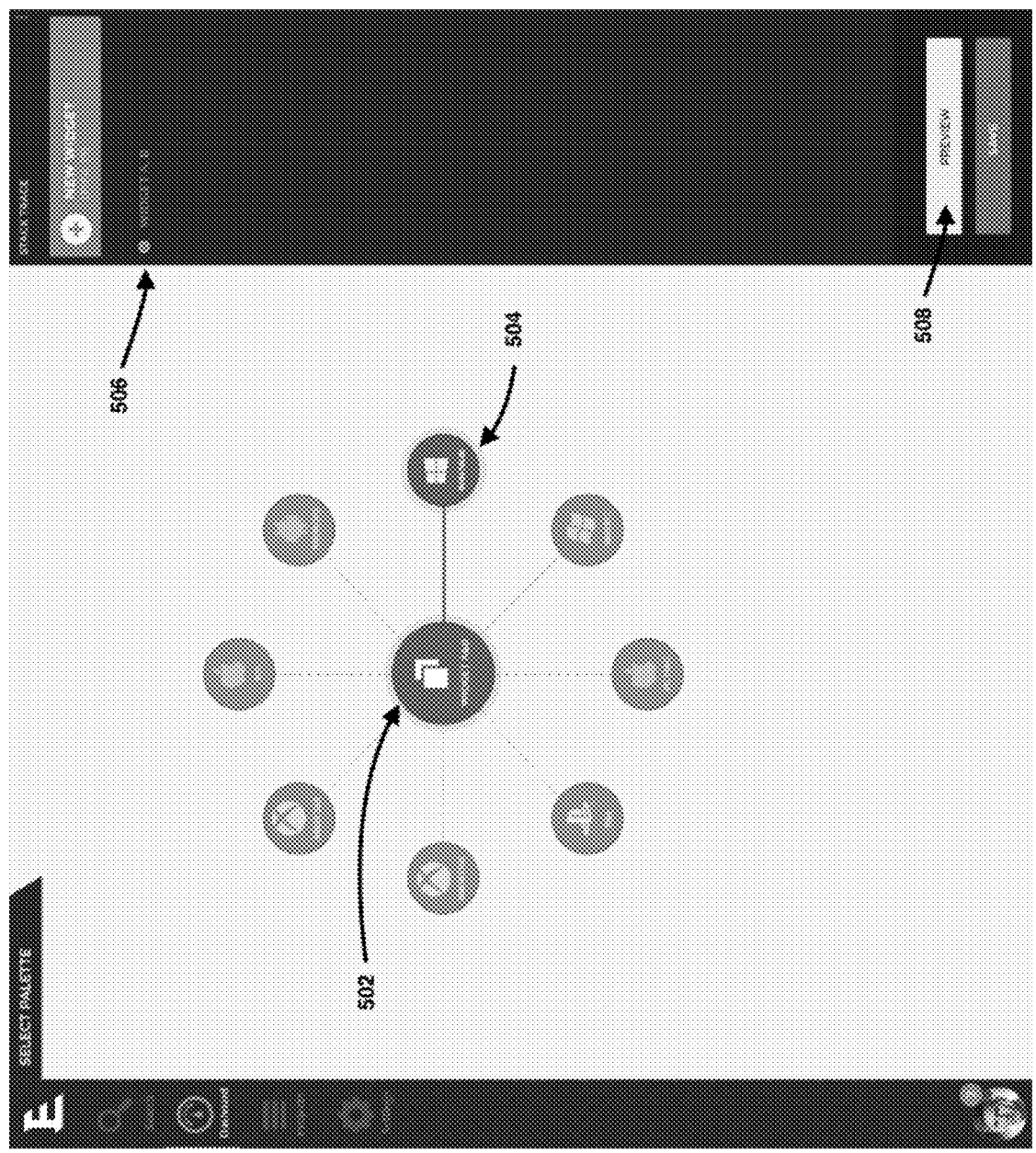
FIG. 5 is a block diagram illustrating a second page of a dashboard interface, according to an implementation.

FIG. 5 is a block diagram illustrating a second page of a dashboard interface, according to an implementation. In one embodiment, dashboard interface module 132 provides the second page of the dashboard interface and handles interaction with the second page (see method 300). Here, the dashboard of the GUI may display a graphical representation of the combined component 502. Combined component 502 may be created when a user drags a first component onto a second component and drops.

In one embodiment, when a user performs the drag and drop action of one component onto another, the GUI replaces the first page default dashboard view of the GUI with the second page view of the GUI. Here, on the second page view, a user may also be presented with one or more options 504 determined by a server that are associated with the combined component 502. One or more options 504 associated with component 502 may be displayed as graphical elements "linked" to their associated component. For example, graphical "option" elements may be presented with a line connecting them to the associated component.

The dashboard interface may also include a graphical element 506 that displays the current status of the component 502. For example, if the combined element has not been further combined with an associated option, element 506 may show only the combined element. When the combined element has been further combined with an associated option, the associated option may be displayed with the combined component on the "stack" represented by graphical element 506. In one embodiment, the dashboard interface may also include a preview button 508. When the preview button 508 has been activated, the dashboard interface may provide a more detailed look at what a finalized widget may look like according the current selected options.

Figure 6:
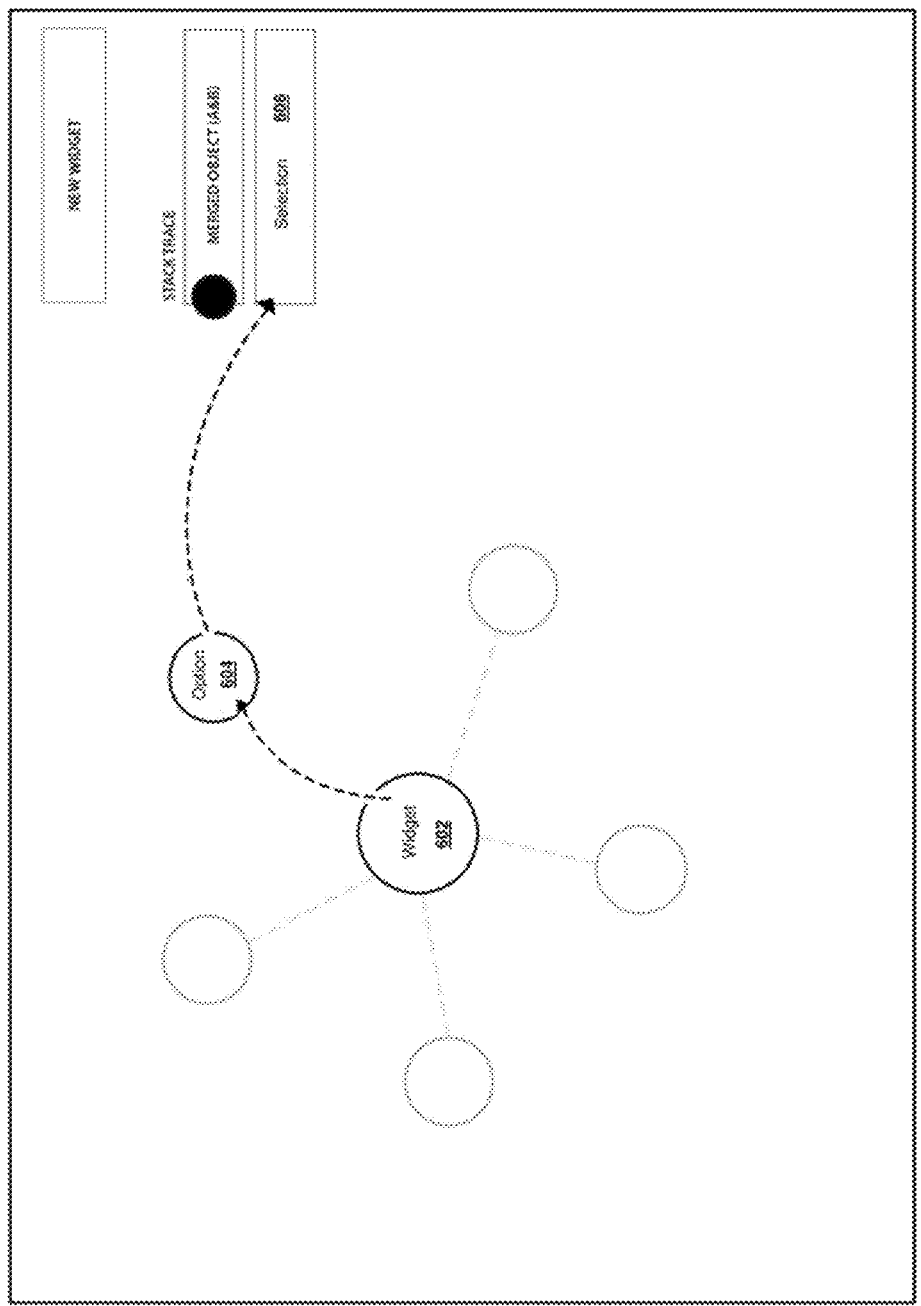
FIG. 6 is a block diagram illustrating drag and drop functionality of a second page of a dashboard interface, according to an implementation.

FIG. 6 is a block diagram illustrating drag and drop functionality of a second page of a dashboard interface, according to an implementation. In one embodiment, dashboard interface module 132 provides the second page of the dashboard interface and handles interaction with the second page (see method 300). FIG. 6 illustrates a combined component (widget 602) being dragged and dropped onto an associated option 604. When the drag and drop is complete, the dashboard interface may display the selected option 604 with the combined component 602 on the stack (as illustrated by 606). In one embodiment, a user may disassociate a previously selected and associated option by selecting the previously selected option on the stack and activating a graphical element that indicates a desire to remove the option. Once disassociation is indicated and the option has been disassociated by a server, dashboard interface 600 may remove the option from the stack.

Figure 7:
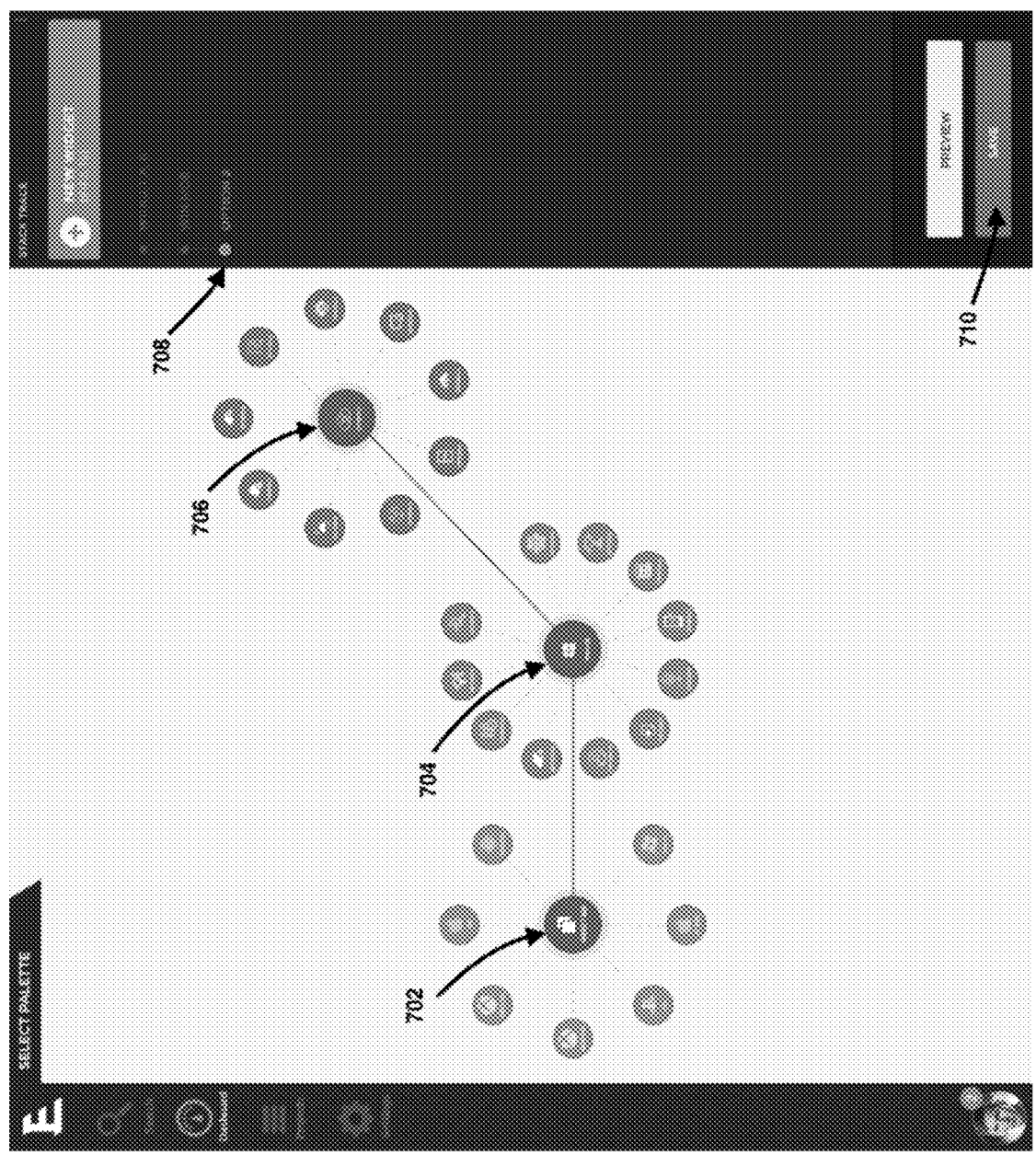
FIG. 7 is a block diagram illustrating various components and options of a second page of a dashboard interface, according to an implementation.

FIG. 7 is a block diagram illustrating various components and options of a second page of a dashboard interface, according to an implementation. In one embodiment, dashboard interface module 132 provides the second page of the dashboard interface and handles interaction with the second page (see method 300). The dashboard interface illustrates an option 704 associated with a combined module 702. The result of the association has been further combined with another option, 706. Combined component 702 and options 704 and 706 can be seen represented on the "stack" graphical element 708.

In one embodiment, dashboard interface 700 includes a "save" graphical element 710. By activating element 710, a user may indicate his desire to finalize the new component with associated options. In so doing, a user indicates that he is done selecting additional options to associate with the component.

Figure 8:
FIG. 8 is a block diagram illustrating a new component of a first page of a dashboard interface, according to an implementation.

FIG. 8 is a block diagram illustrating a new component of a first page of a dashboard interface, according to an implementation. In one embodiment, dashboard interface module 132 provides the first page of the dashboard interface and handles interaction with the first page (see method 300). In one embodiment, the activation of graphical element 712 of FIG. 7 causes the first default page of the GUI to be presented to the user. Block 802 represents a finalized component, based on two previously existing components (e.g., "issues in this week" and "new issues" components) including associated options. The newly finalized "new issues in this week" component 802 may be interacted with on the dashboard interface.

In one embodiment, component 802 may be moved around the dashboard by simply dragging and dropping the component in the desired area. A user may also activate the component or other graphical elements to be provided a more detailed view of the data and databases associated with the component. In one embodiment, a user may remove or edit a component by activating a graphical element on the default dashboard view 800. When editing an existing component, a user may be provided the second page of the dashboard interface where he may add new options and/or remove already associated options.

Figure 9:
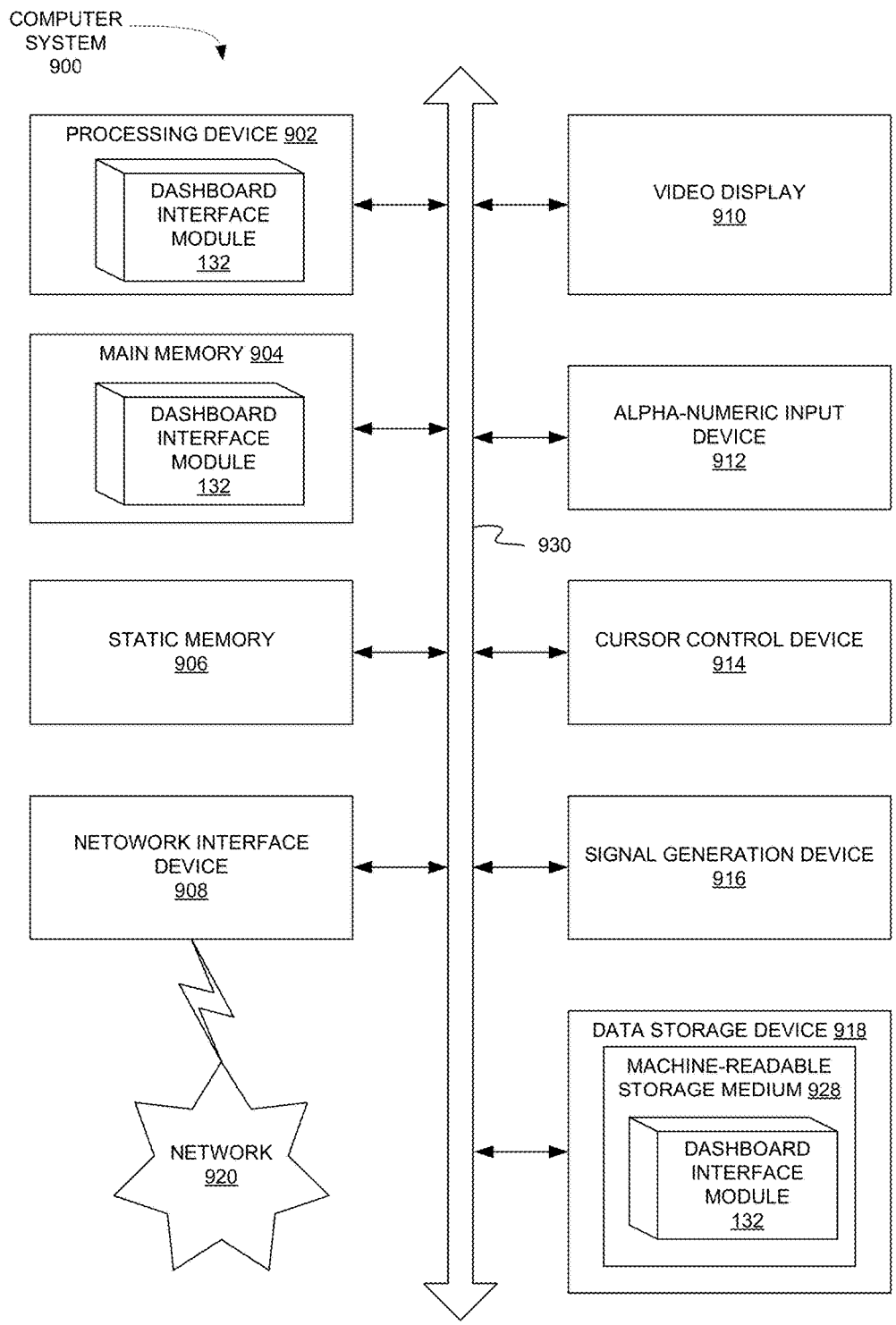
FIG. 9 is a block diagram of an example computer system that may perform one or more of the operations described herein.

FIG. 9 illustrates a diagrammatic representation of a computing device 900 which may implement the systems and methods described herein. Computing device 900 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute dashboard interface module 926 implementing method 300 for creating a dashboard interface for cross database data selection and correlation, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions, e.g., instructions of dashboard interface module 926 implementing method 300 for creating a dashboard interface for cross database data selection and correlation, in accordance with one or more aspects of the present disclosure. Instructions implementing module 926 may also reside, completely or at least partially, within main memory 904 and/or within processing device 902 during execution thereof by computing device 900, main memory 904 and processing device 902 also constituting computer-readable media. The instructions may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving", "sending", "providing", "associating", "removing", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
  receiving, by a processing device, an indication that a first graphical user interface (GUI) component has been dragged onto a second GUI component displayed in a first GUI view;
  sending a first dataset associated with the first GUI component and a second dataset associated with the second GUI component to a server;
  receiving, from the server, a third dataset, wherein the third dataset is based on the first dataset and the second dataset;
  causing a third GUI component to be displayed in a second GUI view which replaces the first GUI view, wherein the third GUI component visually represents the third dataset and one or more options associated with the third dataset;
  receiving a GUI selection of at least one option associated with the third dataset;
  causing the third dataset to be modified based on the selected at least one option;
  receiving, by the processing device, an indication that the third dataset is finalized; and
  causing the third GUI component to be displayed in the first GUI view.

2. The method of claim 1, wherein causing the third dataset to be modified further comprises:
  sending the third dataset and the selected at least one option to the server;
  receiving, from the server, a fourth dataset, wherein the fourth dataset is based on the third dataset and the selected at least one option.

3. The method of claim 1, wherein the first GUI view comprises a dashboard page comprising a plurality of GUI components representing respective datasets.

4. The method of claim 1, wherein the second GUI view comprises a GUI control for disassociating a selected option from the third dataset.

5. The method of claim 4, further comprising:
  responsive to detecting a user action activating the GUI control, removing the third GUI component from the second GUI view; and
  removing the third GUI component from the first GUI view.

6. The method of claim 1, wherein the third dataset comprises an intersection of the first dataset and the second dataset.

7. The method of claim 1, further comprising:
causing the third GUI component to be displayed in a visual association with a plurality of available options and at least one selected option, wherein the at least one slelected option is visually distinct from the plurality of available options.

8. A method, comprising:
receiving, by a processing device, an indication that a first graphical object representing a first dataset has been dragged onto a second graphical object representing a second dataset, wherein the first graphical object and the second graphical object are displayed on a first page of a graphical user interface (GUI);
causing a third graphical object to be displayed on a second page of the GUI, wherein the third graphical object represents a third dataset and one or more graphical objects representing the one or more options associated with the third dataset;
receiving a selection, via the GUI, of at least one option associated with the third dataset;
causing the third dataset to be modified based on the selected at least one option;
receiving, by the processing device, an indication that the third dataset is finalized; and
causing the third graphical object to be displayed on the first page of the GUI.

9. The method of claim 8, wherein causing the third dataset to be modified further comprises:
sending the third dataset and the selected option to the server;
receiving, from the server, a fourth dataset, wherein the fourth dataset is based on a combination of the third dataset and the selected option.

10. The method of claim 8, wherein the first page of the GUI comprises a plurality of graphical objects associated with a plurality of datasets.

11. The method of claim 8, wherein the second page of the GUI comprises a GUI control for disassociating a selected option from the third dataset.

12. The method of claim 11, further comprising:
responsive to detecting a user action activating the GUI control, removing the third graphical object from the second page of the GUI; and
removing the third graphical object from the first page of the GUI.

13. The method of claim 8, wherein the third dataset comprises an intersection of the first dataset and the second dataset.

14. The method of claim 8, further comprising:
causing the third graphical object to be displayed in a visual association with a plurality of available options and at least one selected option, wherein the at least one selected option is visually distinct from the plurality of available options.

15. A non-transitory machine-readable storage medium including instructions that, when accessed by a processing device, cause the processing device to:
receive an indication that a first graphical user interface (GUI) component has been dragged onto a second GUI component displayed on a first GUI page;
send a first dataset associated with the first GUI component and a second dataset associated with the second GUI component to a server;
receive, from the server, a third dataset, wherein the third dataset is based on the first dataset and the second dataset;
cause a third GUI component to be displayed in a second GUI page which replaces the first GUI page, wherein the third GUI component visually represents the third dataset and the one or more options associated with the third dataset;
receiving a GUI selection of at least one option associated with the third dataset;
causing the third dataset to be modified based on the selected at least one option;
receive, by the processing device, an indication that the third dataset is finalized; and
cause the third GUI component to be displayed in the first GUI page.

16. The non-transitory machine-readable storage medium of claim 15, wherein the processing device further to:
send the third dataset and the selected at least one option to the server;
receive, from the server, a fourth dataset, wherein the fourth dataset is based on the third dataset and the selected at least one option.

17. The non-transitory machine-readable storage medium of claim 15, wherein the first GUI page comprises a dashboard page comprising a plurality of GUI components representing respective datasets.

18. The non-transitory machine-readable storage medium of claim 15, wherein the second GUI page comprises a GUI control for disassociating a selected option from the third dataset.

19. The non-transitory machine-readable storage medium of claim 18, wherein the processing device is further to:
responsive to detecting a user action activating the GUI control, remove the third GUI component from the second GUI page of the GUI; and
remove the third GUI component from the first GUI page.

20. The non-transitory machine-readable storage medium of claim 15, wherein the third dataset comprises an intersection of the first dataset and the second dataset.

* * * * *